April 10, 1956  J. T. LECKERT  2,741,383
SELF UNLOADING VEHICLE
Filed July 22, 1954  2 Sheets-Sheet 1
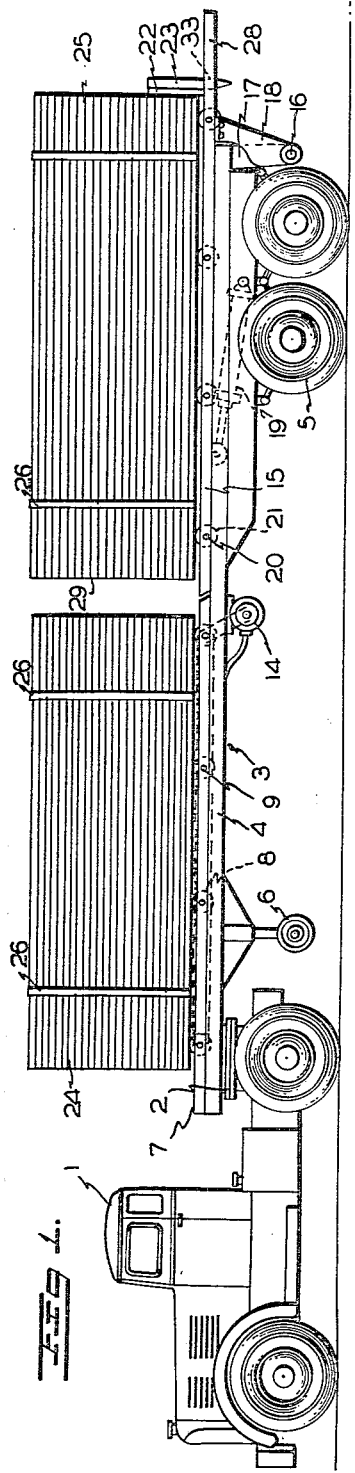
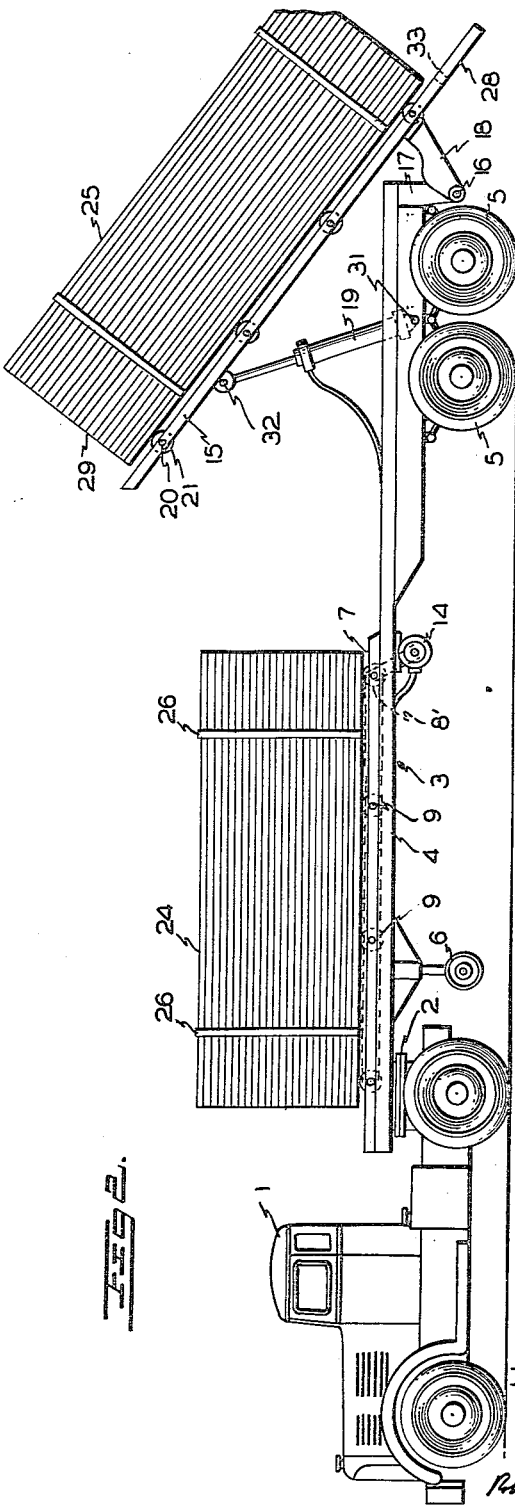
INVENTOR
JOSEPH T. LECKERT
ATTORNEY April 10, 1956　　　J. T. LECKERT　　　2,741,383
SELF UNLOADING VEHICLE
Filed July 22, 1954　　　　　　　　　　　2 Sheets-Sheet 2
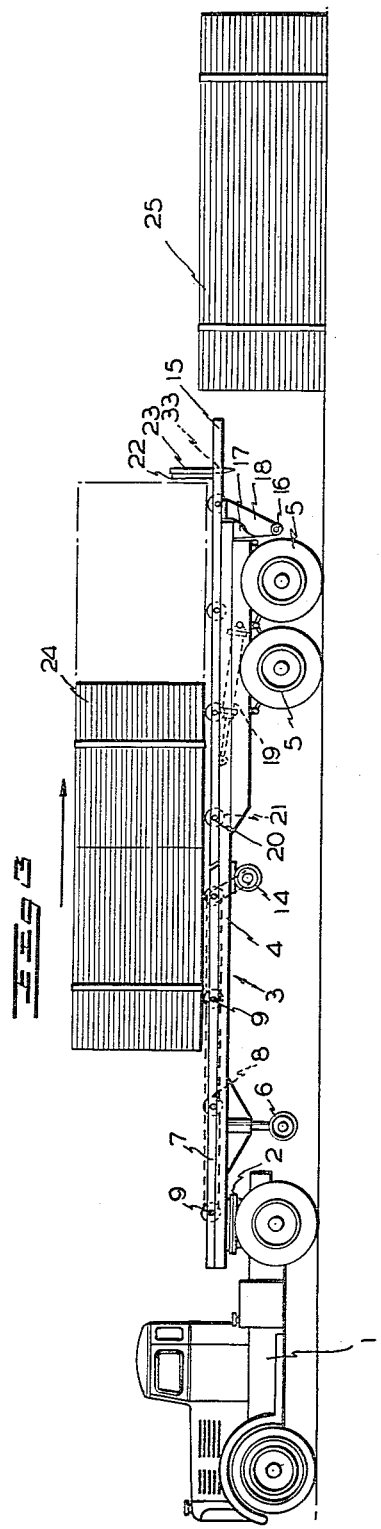
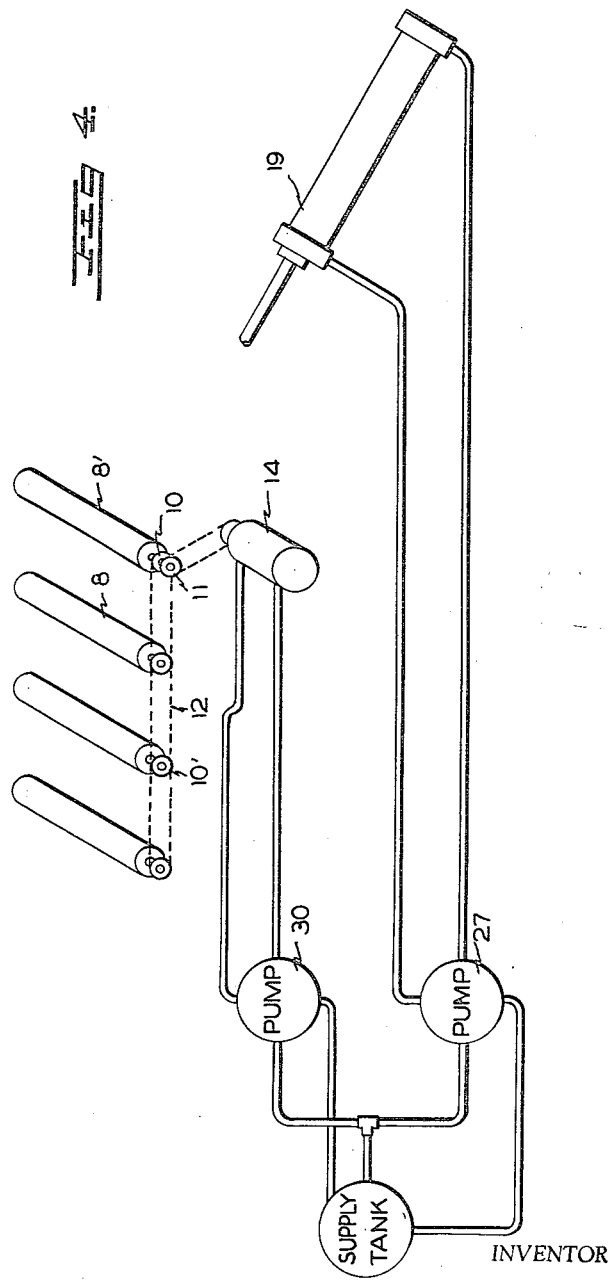
INVENTOR
JOSEPH T. LECKERT
BY
ATTORNEY

United States Patent Office 2,741,383
Patented Apr. 10, 1956

2,741,383

SELF UNLOADING VEHICLE

Joseph T. Leckert, Hyattsville, Md., assignor of one-third to Amos E. Heath, Arlington, Va., and one-third to Robert E. Minton, Bethesda, Md.

Application July 22, 1954, Serial No. 445,113

2 Claims. (Cl. 214—505)

This invention relates generally to self unloading vehicles and more particularly to a self-unloading semi-trailer type vehicle such as is utilized for hauling lumber.

It is well known in the prior art that considerable labor expense is saved along with the service time of the hauling vehicle when such a vehicle is powered to dump the load at its destination, in lieu of outmoded manual unloading operations. Particularly, in unloading lumber, a great saving is effected. However, no practical vehicle has heretofore been provided which will meet the need of dumping partial loads of lumber, or other material, in the manner presented by this invention.

It is, therefore, the primary object of this invention to provide an improved self-dumping vehicle for carrying relatively large grouped loads and for handling and dumping the loads by a power driven mechanism.

A more specific object of this invention is to provide a self-dumping vehicle for carrying relatively large grouped loads including a powered dumping section at the rear thereof for part of the loads, and a powered conveying section forward of the dumping section for carrying the remaining loads and for conveying these remaining loads rearwardly to the dumping section when it is desired to dump the same.

A further object of this invention is to provide an improved lumber-carrying semi-trailer vehicle including a combined power system for transferring a lumber load from the forward section of the vehicle to the rearward section, and for dumping the load as received on the rearward section.

A still further object of this invention is to provide a load-carrying vehicle having a combination loading conveying section and a load dumping section.

A further and more general object of this invention is to provide a powered load handling system for vehicles, particularly semi-trailers, which will benefit the users of the vehicles financially and which will not require expensive vehicle design changes by the manufacturers.

With the foregoing and other objects in mind, the invention resides in the following specification and appended claims, certain embodiments and details of construction of which are illustrated in the accompanying drawings in which:

Figure 1 is a view in side elevation of a vehicle incorporating the invention therein;

Figure 2 is a view similar to Figure 1 with the rear section of the vehicle being tilted to dump a rearwardly placed load of lumber;

Figure 3 is a view similar to Figures 1 and 2 but illustrates the power transfer, provided by the invention of the forwardly placed load of lumber to the rear of the trailer after the first load has been dumped;

Figure 4 is a schematic drawing of a suitable power system for the invention as applied to the semi-trailer vehicle of Figures 1 to 3 inclusive.

Referring more particularly to the drawings, a tractor 1 is illustrated as being connected by the usual fifth-wheel 2 to a semi-trailer, generally indicated at 3. The semi-trailer includes a suitable underframe 4 with the usual running wheels 5 at the rear thereof and the usual stub wheels 6 for supporting the forward section of the trailer 3 when disconnected from the tractor.

A load platform 7 is suitably secured to the forward section of the frame 4. A plurality of rollers 8 are journalled at 9 in the platform 7 in such manner that a portion of the roller peripheries extend an appreciable distance above the upper surface of platform 7. Each roller 8 is provided with a sprocket wheel 10 (Figure 4). Roller 8' is provided with a second sprocket wheel 11. Interconnecting sprocket wheels 10 is a chain 12. Sprocket wheel 11 is connected by a chain 13 to a fluid driving motor 14, the operation of which will appear later in the specification. It is preferable, but not essential, that all of the rollers be driven.

A second load platform 15 is pivotally secured to the frame 4 about pivot pin 16 which extends through suitable apertures in a depending bracket 17 of frame 4 and a depending bracket 18 of platform 15. The platform 15 is moved in the vertical plane from the horizontal, to the position shown in Figure 3, by a suitable power servo 19, the operation of which will be given later in the specification. The servo 19 is pivotally secured to the vehicle at 31 and to the platform 15 at 32.

Freely journalled at 20 in platform 15 are a plurality of rollers 21. A portion of the peripheries of rollers 21 extends above the upper surface of the platform 15 a distance equal to that distance rollers 8 extend above platform 7. A retaining plate 22 is removably connected to platform 15 by downwardly extending pegs 23 which are received by apertures 33 in platform 15.

The operation of the combination transferring and unloading mechanism will now be obvious to those skilled in the art. In Figure 1, two separate loads of lumber 24 and 25, with suitable binding straps 26, are illustrated as being supported on the forward and rearward sections or platforms 7 and 15 of the semi-trailer 3. Upon arrival at his destination, the operator actuates the servo 19 by suitable means (not shown) controlling fluid flow from pump 27 to servo 19. With retaining plate 22 removed, the platform 15 is tilted upwardly by the servo about pivot pin 16 so that the rear portion 28 of the platform 15 approaches the ground. The bound lumber 25 will move rearwardly down the inclined platform by gravity. The rollers 21, which actually support the lumber 25 permit a relatively free movement of the lumber. After the end of the lumber strikes the ground the tractor trailer is driven forwardly so that the forward end 29 of the lumber 25 will clear the rear end 28 of platform 15 and drop to the ground.

The operator of the vehicle then lowers the platform 15 to its original position of Figures 1 and 3. Load 24 may now be transferred from platform 7 to platform 15 by the powered rollers 8. The operator controls the discharge from pump 30, by means (not shown) to drive fluid motor 14 and consequently the rollers 8 and 8' through chains 12 and 13. The load 24 is conveyed rearwardly on the free rollers 21 of platform 15, (Fig. 3). The operator may then reactuate the servo 19 to tilt platform 15 and hence dump load 24, as in the case of load 25.

A suitable mechanical locking or braking means (not shown) may be provided for rollers 21, to control the discharge of a load from the tilted platform 20 in order to prevent damage to the load.

It is realized that suitable electric or mechanical power takeoff systems could be utilized to actuate both the powered rollers 8 and the elevating servo 19. The disclosed system of Figure 4 is merely one in which the power takeoff (not shown) of the tractor 1 drives the pumps 27 and 30 to provide fluid under pressure for driving motors 14 and 19. This power system is obviously subject to many modifications.

While the invention has been illustrated as being applied to a semi-trailer, it is obviously equally adaptable to trucks where the operation and utility would be the same as on a trailer.

In order to efficiently carry large loads of lumber involving many thousands of board feet, particularly long vehicles are required. If the entire vehicle were to be tilted to unload the lumber, as suggested by the prior art, the vehicle becomes too unstable and will have a tendency to upset. It is, therefore, obvious that the present invention solves the problem by permitting partial unloading from these large vehicles.

I claim:

1. A self unloading vehicle comprising an underframe, wheels for movably carrying said frame, a forward stationary load platform secured to the frame, a tiltable load platform pivotally secured to the rear of said vehicle frame, a plurality of rollers journalled in said stationary platform with a portion of the periphery of each roller extending an appreciable distance above the platform, power means to drive at least one of said rollers, a plurality of freely journalled rollers mounted in said tiltable platform with a portion of the periphery of each roller extending an appreciable distance above the tiltable platform, and power means interconnected between the vehicle underframe and the tiltable platform to move said platform about its pivoted connection with the underframe.

2. A load carrying vehicle with an underframe and supporting wheels therefor comprising a stationary load platform located forwardly on the vehicle and secured on said underframe, a tiltable load platform, normally forming a substantially continuous rearward load carrying platform with said stationary platform, pivotally carried by said underframe at the rear end thereof, power means secured to said underframe to move said tiltable platform upwardly and downwardly about its pivotal connection with said underframe, power transfer means connected with said stationary load platform to move loads rearwardly on the vehicle onto said tiltable platform, and means upstanding from the surface of said tiltable platform for reducing the frictional engagement of loads with said tiltable platform.

References Cited in the file of this patent

UNITED STATES PATENTS

| 1,538,052 | Mueller | May 19, 1925 |
| 1,910,398 | Ludington | May 23, 1933 |
| 2,087,846 | Jahn | July 20, 1937 |
| 2,156,438 | Suverkrup | May 2, 1939 |
| 2,305,148 | Dempster | Dec. 15, 1942 |
| 2,418,726 | Rogers, Jr. | Apr. 8, 1947 |
| 2,557,203 | Rehberger | June 19, 1951 |
| 2,606,678 | Penberthy et al. | Aug. 12, 1952 |
| 2,613,827 | Van Doorne | Oct. 14, 1952 |

FOREIGN PATENTS

| 143,943 | Sweden | Feb. 2, 1954 |